United States Patent [19]
Lee et al.

[11] Patent Number: 5,719,862
[45] Date of Patent: Feb. 17, 1998

[54] PACKET-BASED DYNAMIC DE-SKEWING FOR NETWORK SWITCH WITH LOCAL OR CENTRAL CLOCK

[75] Inventors: Raymond K. Lee, Cupertino; Alex Chi-Ming Hui, Los Altos, both of Calif.

[73] Assignee: Pericom Semiconductor Corp., San Jose, Calif.

[21] Appl. No.: 649,114

[22] Filed: May 14, 1996

[51] Int. Cl.$^6$ .................... H04J 3/06; H04L 12/56
[52] U.S. Cl. .................. 370/355; 370/389; 370/506; 370/514; 370/516; 340/825.8; 375/371
[58] Field of Search .................. 370/218, 250, 370/252, 253, 355, 357, 359, 360, 388, 389, 400, 445, 447, 461, 503, 505, 506, 514, 516, 520; 340/825.03, 826, 827, 825.79, 825.8; 375/362, 364, 371

[56] References Cited

U.S. PATENT DOCUMENTS

| | | | |
|---|---|---|---|
| 5,197,064 | 3/1993 | Chao | 370/398 |
| 5,289,461 | 2/1994 | de Nijs | 370/360 |
| 5,301,333 | 4/1994 | Lee | 395/725 |
| 5,377,182 | 12/1994 | Monacos | 370/355 |
| 5,383,183 | 1/1995 | Yoshida | 370/355 |
| 5,408,469 | 4/1995 | Opher et al. | 370/397 |
| 5,408,473 | 4/1995 | Hutchison et al. | 370/506 |
| 5,408,507 | 4/1995 | McNamara et al. | 375/371 |
| 5,414,381 | 5/1995 | Nelson et al. | 327/262 |
| 5,452,330 | 9/1995 | Goldstein | 375/257 |
| 5,521,928 | 5/1996 | Worsley et al. | 370/362 |
| 5,613,069 | 3/1997 | Walker | 370/355 |

OTHER PUBLICATIONS

"Digital–Phase Aligner Macro for Clock Tree Compensation with 70ps Jitter", Woeste et al., ISSCC 1996.
"Switch–on–a–chip IBM's ATM Switching Technology", A. Engherson, Sep. 15, 1994.
"Abacus Switch figures ATM I/O", H.J. Caho et al., EE Times, Jan. 15, 1996.
"Ethernet Switching, an Anixter White Paper", Anixiter Inc., Jan. 17, 1996, pp.1–10.
"A 9.6 GibaByte/s Throughput Plesiochronous Routing Chip", A. Mu et al., HAL Computer Systems, Inc.
"Bus–Switching Chip busts bandwidth barriers", J. Child, Computer Design, Jun. 1995.
"Express 100BAST–TX Switching Hub", Intel Corp., 1996.
"Performance Networking with Switching Hubs", M. Banic, 3TECH, Jan. 1995, pp. 1–7.

*Primary Examiner*—Alpus H. Hsu
*Attorney, Agent, or Firm*—Stuart T. Auvinen

[57] ABSTRACT

A network switch uses a simple switch core of analog MOS transistor switches. The switch core is surrounded by many media-access controllers (MAC's) which buffer the data through the switch core. Multiple connections through the switch core may be made between different pairs of MAC's. Just one signal path through the switch core is needed per connection as a second path through the switch core for the clock is not needed. The clock is not encoded with the data, so PLL's are not needed for clock recovery. Data skew is instead measured for each packet transmitted through the switch core. A start flag is added to the packet by a source MAC as a packet header before being transmitted through the switch core. The start flag is a unique sequence which is detected by the destination MAC and triggers measurement of the data skew of the received start flag to the local clock. The measured data skew is then used to compensate for the rest of the packet. Because dynamic de-skewing is performed for each packet, any packet from any source MAC can be received. This allows freedom in MAC placement and enables construction of larger switches. The switch may have the MAC's physically separated from each other by greater distances since clocks can be locally generated. The clocks are independent from each other except for having the same frequency.

21 Claims, 6 Drawing Sheets

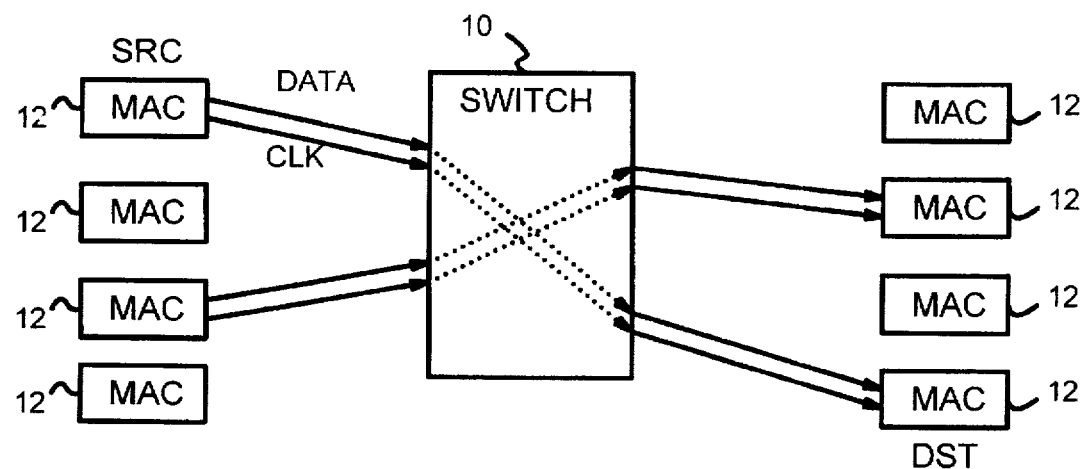
PRIOR ART  FIG. 1
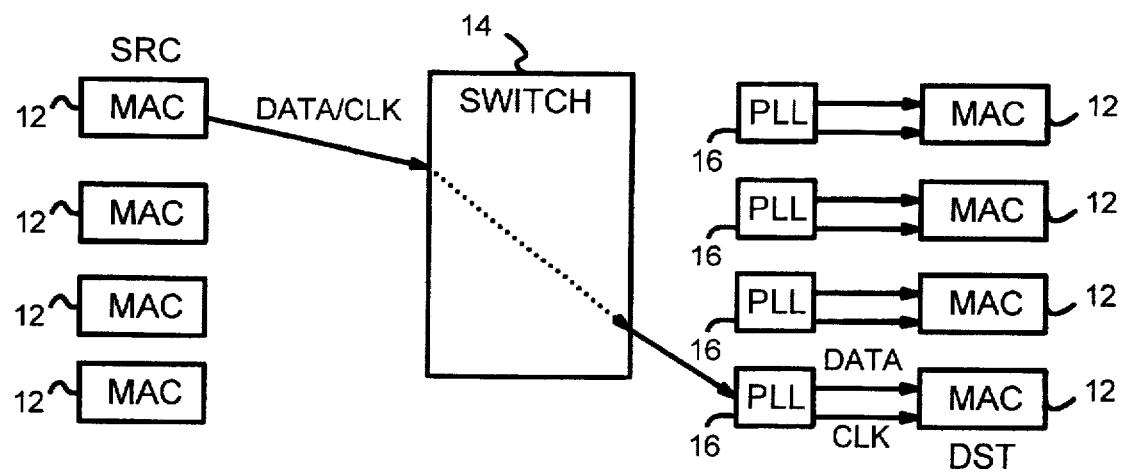
PRIOR ART  FIG. 2

DATA PACKET
50
TRANSMITTED PACKET
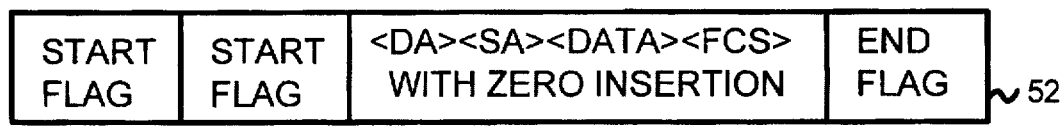
52
FIG. 6
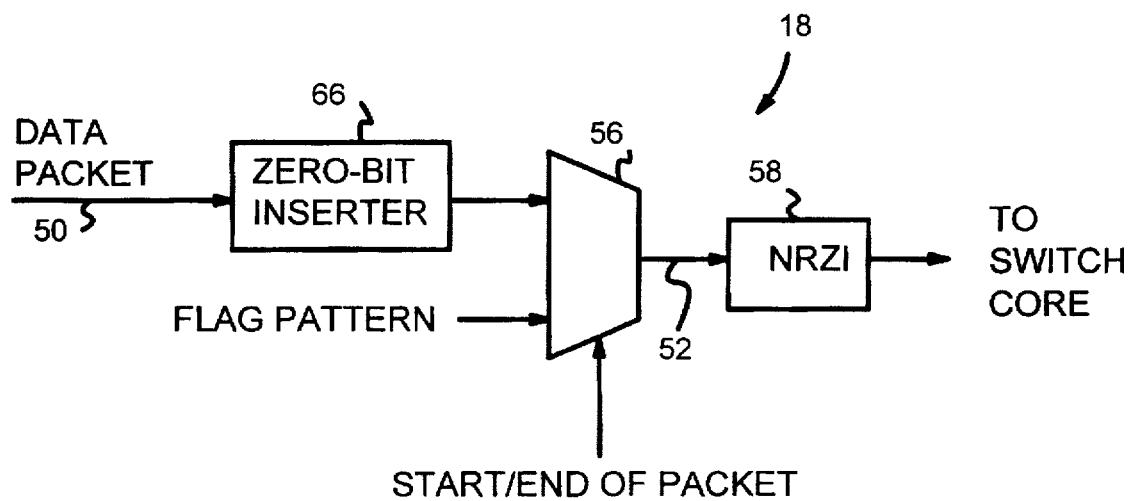
FIG. 7

5,719,862

PACKET-BASED DYNAMIC DE-SKEWING FOR NETWORK SWITCH WITH LOCAL OR CENTRAL CLOCK

BACKGROUND OF THE INVENTION

1. Field of the Invention

This invention relates to network switches, and more particularly to a network switch architecture with packet-based dynamic de-skewing.

2. Description of the Related Art

Today's computers are being networked together at a dizzying pace. Local-area networks (LAN's) connect a group of workstations or personal computers (PC's) together. The PC's can be linked together in a traditional ring or star topography with hubs or routers providing connection to other LANs.

Network switches are fast becoming the technology of choice, being preferred over routers and repeater hubs for extending and improving existing networks. Pre-existing or "legacy" LAN's often have new bottlenecks as additional users are inserted into the LAN. Higher-traffic applications such as high-resolution graphics, printing, and CAD/CAE, and Internet/intranet applications deplete available network bandwidth.

Switches increase available bandwidth on a LAN by providing multiple connections directly between points on the LAN, rather than sharing a common single connection point between all PC's on the LAN. The LAN is divided into smaller nodes of one or a few PC's each, which are connected together by a shared media which is connected to a port on the switch. The switch provides direct point-to-point links between ports using a direct line of communication from one port to another through the switch. Multiple simultaneous links may be maintained through the switch, and each link may be full-duplex (bi-directional). Each port has the full bandwidth available, without interference from other ports in the switch, since other ports can be given their own direct link through the switch to other ports.

A switch can extend the size of a LAN. The 100Base-TX Fast Ethernet standard limits LANs to a physical diameter of 205 meters with two repeater hops. A large building can exceed this diameter, requiring separate LAN's. Switches can be used to connect smaller nodes on the LAN so that the LAN has a diameter much larger than 205 meters.

Switches are also useful for multi-protocol networks. Since each port-to-port line through the switch is separate from the other links, different protocols may be used for different links.

Some links may use the older 10BaseT standard while other links use the faster 100BaseT standard. This eases transitions to newer standards as the entire network does not have to be upgraded simultaneously.

A few examples of prior-art network switches are U.S. Pat. No. 5,383,183 by Yoshida, assigned to NEC Corporation; U.S. Pat. No. 5,289,461 by de Nijs and assigned to IBM; and U.S. Pat. No. 5,408,469 by Opher et al., assigned to SynOptics (now Bay Networks) of Santa Clara Calif.

Unfortunately, switches are relatively expensive. Often custom very-large-scale-integration (VLSI) integrated circuits are used to construct the switch matrix core. Clock recovery circuits such as phase-locked-loops (PLL's) are often used for each port. Many switches lack flexibility and expandability. Clock synchronization is often a problem limiting performance.

FIG. 1 is a diagram of a prior-art switch which transmits the clock through the switch core along with the data. Each port to the switch has a media-access-controller (MAC) 12. MAC 12 provides an interface to the physical layer which connects to the media of a node (not shown). Switch core 10 provides connection path between a source MAC 12 and a destination MAC 12. Many other paths may be provided between other MAC's 12 at the same time.

The paths between MAC's 12 through switch core 10 may be broken and new paths established between other MAC's 12 as individual PC's communicate with different network resources. Switch core 10 provides these paths as needed by the network traffic.

Since paths are frequently broken and established, each path may have different delay characteristics. To exactly match the delay for the data to the delay for the clock, both the clock and the data stream are passed through switch core 10 in parallel. Thus each connection requires at least two signal paths—one for the data, and another for the clock.

Routing the clock through the switch core doubles the number of paths in switch core 10. This increases the cost of the switch core. However, routing the clock around switch core 10 would provide the clock with a different delay path than the data, and for high-speed data transfer these skews can exceed the clock period and cause failures. Slower clock frequencies may be used when parallel data rather than serial data is passed through switch core 10, but parallel data significantly increases the size and cost switch core 10. Eight-bit parallel data requires eight times as many signal paths through switch core 10 as does serial data, although a much slower clock could be used.

FIG. 2 is another prior-art switch which encodes the clock with the data and uses PLL's to recover the clock. Source MAC 12 receives data from a local node and encodes the clock into the data using well-known techniques before transmitting the data to switch core 14 PLL 16 receives the combined clock and data signal from switch core 14 and extracts the clock from the data and transmits these to destination MAC 12 which retransmits the data to the remote node.

While only one signal line through switch core 14 is required for a link, PLL's are required for each destination MAC 12. These PLL's are expensive, increasing the cost of the switch. A low pin-count switch core is provided, but at the expense of the additional PLL's.

What is desired is a network switch which does not require a second path through the switch core for the clock. It is desired to transmit data serially through the switch core at the full clock rate rather than transmitting parallel data at a reduced clock rate. It is also desired to eliminate PLL's on the MAC' in the switch. A more flexible, scaleable, and lower-cost network switch is desired which uses a simple, low-cost switch core. It is desirable that the switch core operate at different speeds for different protocols.

SUMMARY OF THE INVENTION

A switch makes multiple, simultaneous connections between nodes on a network. The switch has a switch-matrix core with a plurality of ports. The switch-matrix core establishes connections between the ports for analog transmission of data packets. A plurality of framers is coupled to ports on the switch-matrix core. Each framer transmits a flag header immediately before each data packet is transmitted to a port of the switch-matrix.

A skew detector is coupled to a port of the switch-matrix core. It determines an amount of clock skew of a data packet transmitted through the switch-matrix core. A skew compensator is coupled to the skew detector and is coupled to the port of the switch-matrix core. It adds a delay to the data packet transmitted through the switch core. The delay is determined by the skew detector.

The switch also has a plurality of media-access controllers (MAC's). Each MAC is connected to a node on the network for driving and receiving physical signals of a data packet. Each MAC can transmit the data packet received from the node on the network to the framer or receive a data packet from the skew compensator and re-transmit the data packet to the node on the network. Thus skew is detected and compensated for.

In further aspects of the invention a switch controller is coupled to the switch-matrix core. It receives a request and a destination address from a source MAC. The switch controller requests a connection between a first port coupled to the source MAC and a second port connected to a destination MAC. The destination MAC is identified by the destination address. Arbitration means in the switch controller selects the request from the source MAC from a plurality of simultaneous requests from MAC's. Thus the switch controller arbitrates requests for the switch-matrix core.

In still further aspects the switch-matrix core is an integrated circuit (IC). The ports on the switch-matrix are pins on the IC, and the switch controller is a separate. IC. Thus the switch-matrix core is a separate IC than the switch controller.

In other aspects a plurality of activity detectors detect an absence of signal transitions on a port. Tear-down means is responsive to the plurality of activity detectors. It disables a connection between a first port and a second port when an absence of signal transitions is detected on the first port. A busy signal means is responsive to the switch controller requesting a connection between the first port and the second port. It signals to the switch controller that the connection cannot be made when either the first port or the second port is not idle. Thus idle connections are closed by the switch-matrix core.

BRIEF DESCRIPTION OF THE DRAWINGS

FIG. 1 is a diagram of a prior-art switch which transmits the clock through the switch core along with the data.

FIG. 2 is another prior-art switch which encodes the clock with the dam and uses PLL's to recover the clock.

FIG. 6 is a diagram of a data packet from the MAC and the packet transmitted through the switch core.

FIG. 7 is a diagram of a packet framer which adds a start flag sequence to each packet transmitted.

DETAILED DESCRIPTION

The present invention relates to an improvement in network switches. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 3:
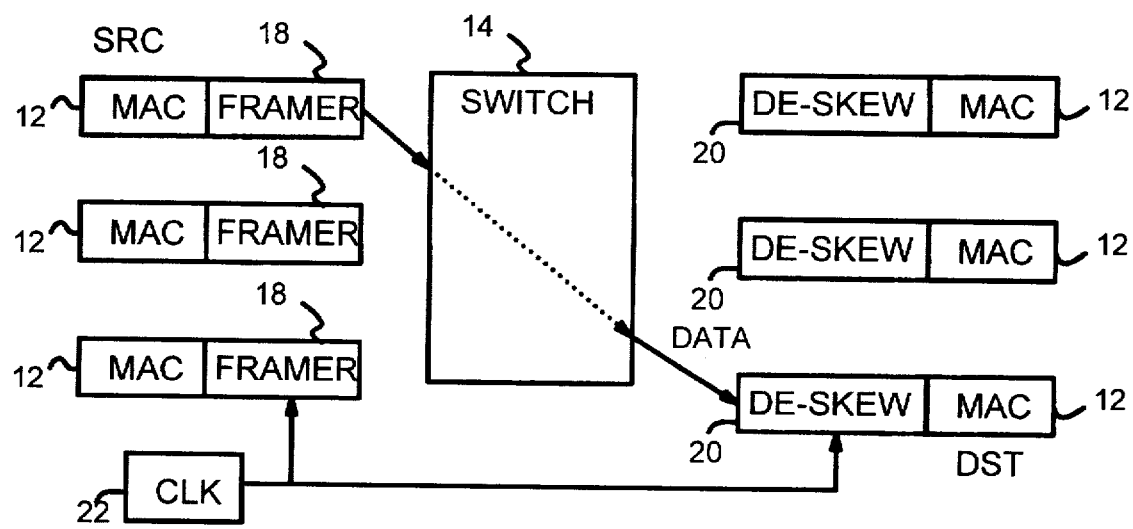
FIG. 3 is a diagram of a network switch with packet-based de-skewing.

FIG. 3 is a diagram of a network switch with packet-based de-skewing. Source media-access controllers (MAC's) 12 are provided with framer 18, while destination MAC's 12 are provided with de-skew circuit 20. A single serial data line through switch core 14 is used for each link. The clock is not encoded with the data, but is provided by clock source 22 to all instances of MAC 12, framer 18, and de-skew circuit 20.

Framer 18 receives a serial data packet from source MAC 12 and adds a start flag sequence to the beginning of the serial data packet. The start flag sequence is a MAC header for the data packet sent through the switch core. The start flag sequence is a serial sequence of ones and zeros which is unique, preferably 01111110. The original serial data packet is modified by framer 18 if necessary so that this start flag sequence does not appear in the data portion of the packet.

The start flag sequence, followed by the data packet, which may have been modified, is transmitted over the signal line through switch core 14 to destination MAC 12. Only one signal line through switch core 14 is needed for each communication link. A second signal line for a clock is not needed, nor is the clock encoded into the data stream, so a receive phase-locked-loop (PLL) is not necessary. The data packet is sent serially over the signal line; parallel data paths are not needed through switch core 14.

After being output from switch core 14, the start flag sequence followed by the data packet, is received by de-skew circuit 20 for destination MAC 12. De-skew circuit 20 detects the unique start-flag sequence 01111110 and measures the clock skew by phase comparison of the received start flag with the known pattern 01111110 of the start flag. The amount of skew detected from the start flag sequence is stored and used to select the correct amount of phase delay to de-skew the remaining data packet.

Each new data packet transmitted through switch core 14 is preceded by the start flag sequence, and the skew is re-calculated for each packet. As communication links are broken and new links through switch core 14 are established, these new links introduce a different amount of skew. The new amount of skew for each new link is measured for each packet transmitted by phase comparison of the start flag sequence.

Figure 4:
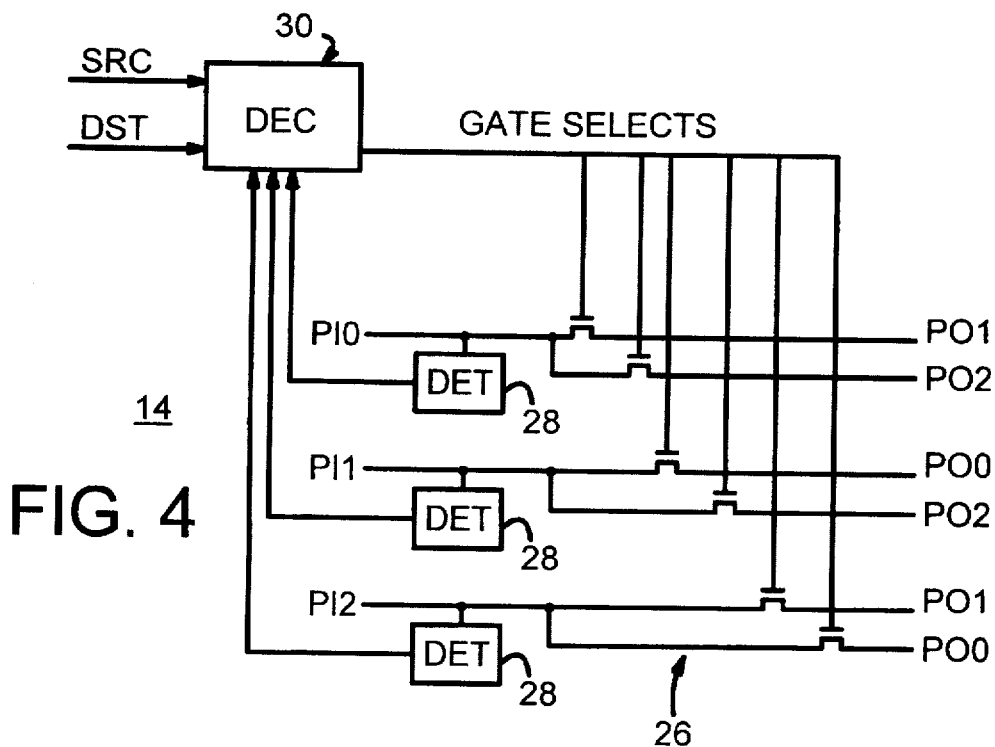
FIG. 4 is a diagram detailing a switch core.

Switch Core—FIG. 4

FIG. 4 is a diagram detailing a switch core. Switch core 14 contains metal-oxide-semiconductor (MOS) transistors 26 which connect an input pin or port to an output port. For simplicity, FIG. 4 shows a simple 3-port switch core 14, but a 32-port device can be manufactured in a standard 100-pin integrated circuit (IC) package. Each input port PI0, PI1, PI2, is connected to the drain of an n-channel transistor which has its source connected to output ports PO0, PO1, PO2. Thus input port PI0 may be connected to output port PO1 or output port PO2.

Multiple communication links may be made through switch core 14. For example, input port PI0 may be connected to output port PO1, while at the same time input port PI1 is connected to output port PO2. These connections may be broken and new connections established as network traffic requires. Full-duplex communication is possible when source and destination MAC's are placed together for servicing a port. For example, full-duplex communication between ports 1 and 2 is accomplished by establishing a first link between ports PI1 and PO2, and a second link between ports PI2 and PO1.

Activity detectors 28 are placed on input ports PI0, PI1, PI2 and signal when no activity occurs on the input port. Since NRZI encoding is used for the serial data, transitions always occur during transmission. Lack to signal transitions indicates that the packet has finished transmission, and the link is no longer in use. The link may then be disconnected or "torn-down" by placing a low voltage on the gate select signal to the transistor forming the unused link. Activity detectors 28 detect the lack of activity and signal decoder 30 to lower the voltage on all gates of transistors connected to the inactive input port.

Connections are established when the source and destination port addresses are strobed into decoder 30. Decoder 30 then determines which transistor in transistors 26 should be activated, and its gate select is raised to a high voltage. Activity detector must not be set to signal no-activity for too short a period of time, since a brief period of inactivity may occur when a link is initially established. Decoder 30 may contain a simple state machine for setting up and tearing down the links.

The simple construction of switch core 14 allows for high-speed serial signals to be transmitted. Each link can operate at a different data rate, and different protocols may be used for different links. Since a clock is not used by switch core 14, the switch core is not limited by a clock. The switch core is only limited by the quality of the MOS transistor and potential cross-talk. The signal distortion is $R_{on}$ divided by $R_{load}$, which strongly depends upon the on resistance $R_{on}$ of the MOS transistor. Thus, several hundred Mbps is achievable.

Buffering within switch core 14 is not needed as the n-channel transistors rapidly pass data through. The simple switch core is inexpensive to manufacture and can be cascaded with other switch-core IC's to make larger switch matrices. Cascaded switch cores introduce additional delay and skew, but by calculating the skew for each connection and each packet, the additional delay is accounted for.

Switch core 14 can be manufactured as a 100-pin IC for 32 ports. The pin definitions for this IC are:

| | |
|---|---|
| SRC | Source Port address input (5 pins encodes 32 ports) |
| DST | Destination Port address input (5 pins encodes 32 ports) |
| STB | Strobe to latch in port address |
| CMD | Command output indicating connection made |
| BSY | Requested port is busy (Output) |
| RST | Reset input |
| CLK | State machine clock |
| PI[0:31] | Switch input ports |
| PO[0:31] | Switch output ports |

Since 100-pin packages are common, switch core 14 is inexpensive to manufacture.

Figure 5:
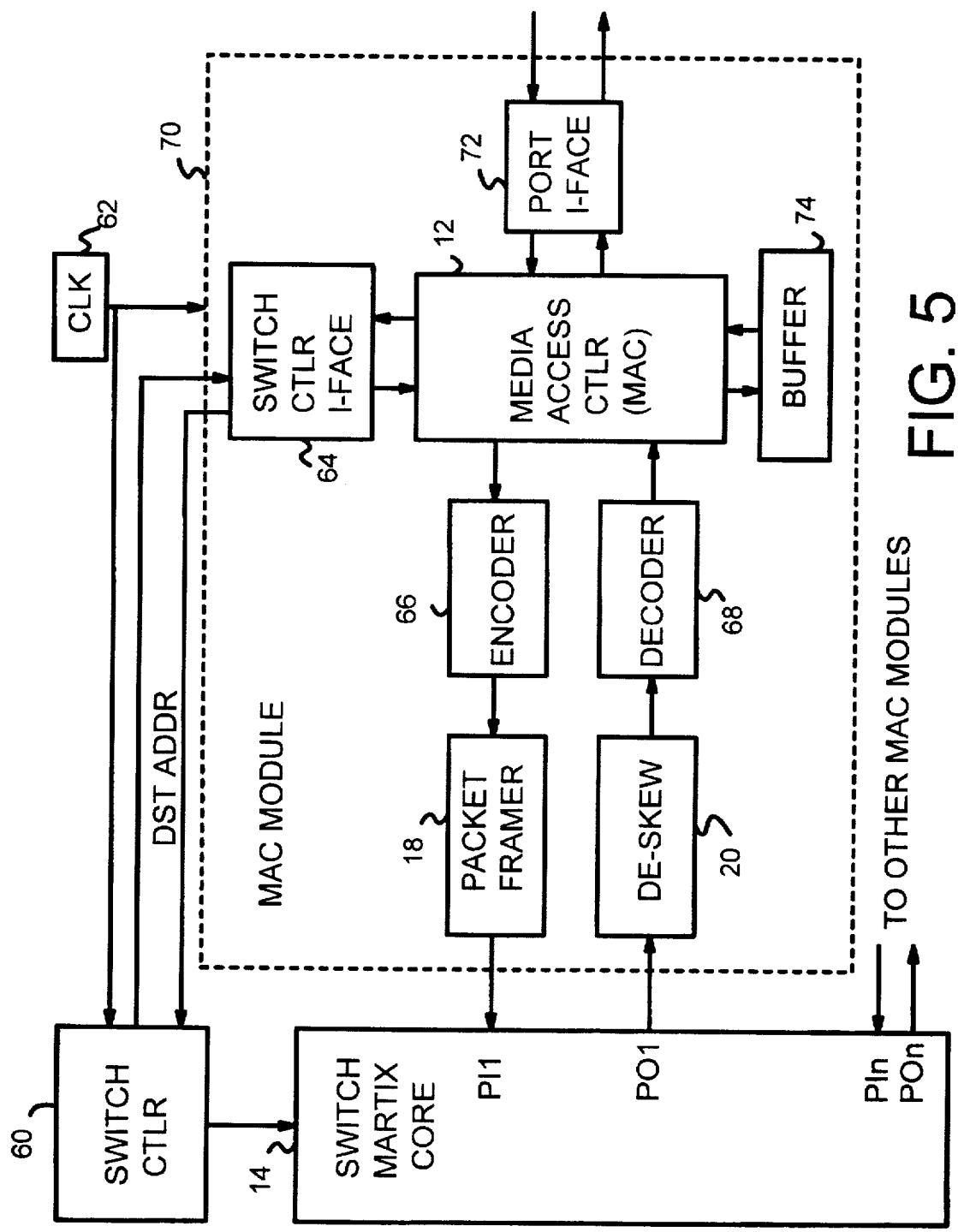
FIG. 5 is a diagram of a bi-directional MAC module with framing and de-skewing for a network switch.

MAC Module—FIG. 5

FIG. 5 is a diagram of a bi-directional MAC module with framing and de-skewing for a network switch. A network switch is constructed from switch core 14, which is a 100-pin IC, and several instances of MAC module 70, and switch controller 60. While a network switch may be constructed from just one switch core 14, and one switch controller 60, several instances of MAC module 70 are required. One instance of MAC module 70 is connected to each pair of input and output ports on switch core 14 which are used for connection to a different node of the network. Thus each MAC module 70 forms an interface between a node of the network and switch core 14.

MAC module 70 is typically a printed-circuit card or module which is plugged into a chassis which also contains switch core 14 and switch controller 60. As new nodes on the network are added, or existing nodes are split, additional MAC modules 70 may be inserted into the chassis, expanding the switch and the network.

MAC module 70 includes a protocol media-access controller (MAC) 12 which performs access functions defined by the network protocol, and such functions as checking a CRC frame-checksum field transmitted with a packet against a recently-generated checksum for the packet to detect transmission errors. MAC 12 may contain a bi-directional MAC capable of two separate MAC functions, one for each direction. Port-interface 72 connects the external network node containing the PC's or workstations to MAC 12. Port interface 72 provides an interface to the physical media of the network node, and provides bi-directional operation, possibly using two physical media.

Buffer 74 provides data buffering, either as a FIFO buffer during transmission, or receiving the entire packet from port interface 72 when the desired destination port on switch core 14 is busy. Buffer 74 may also be used to store a data packet received from switch core 14 when the network node is busy and port interface 74 is unable to immediately transmit the received packet to the network node.

Switch interface 64 sends requests to transmit a packet through switch core 14 to switch controller 60, along with the destination address. The destination address (DA) is contained in the data packet. It is a lengthy network address such as an OUI (Organizationally Unique Identifier) or MAC address, which is a unique six-byte address assigned by the IEEE. Switch controller 60 responds with a busy signal when the destination port is in use and the connection cannot yet be made, or with an acknowledgment when the connection is established. Clock source 62 provides a common clock to MAC module 70 and switch controller 60.

Switch controller 60 uses the following signals:

| | |
|---|---|
| REQ | Request from a MAC for a connection in the switch core |
| SendDA | Output to MAC to send destination address |
| DA | Destination OUI address from the MAC |
| SendPkt | Send Packet output to the MAC |

Switch controller 60 performs arbitration between requests. Many different arbitration schemes my be employed, such as a simple round-robin scheme. A look-up table is used for forwarding information to network addresses which might be on one of the network nodes connected directly to a destination MAC, or a more remote location which is routed through the MAC. Should the address not be found, a special address locator request may be broadcast to find the location of the destination, and the routing to it.

Encoder 66 inserts zero bits in the data packet being transmitted to ensure that the data packet does not contain a sequence of six ones such as found in the start flag (01111110). When the data packet happens to have the same sequence as the start-flag sequence, zero-insertion by encoder 66 breaks this sequence up. Thus the start flag pattern can only occur in the start and ending flags of the packet transmitted through switch core 14. Decoder 68 is used to remove these inserted zeros on the receive side, and convert the data back to RZ format from NRZI format.

In a preferred embodiment a zero is inserted after every sequence of five ones in the data packet. Decoder 68 scans the transmitted packet for sequences of five ones and then removes the next zero.

Packet framer 18 adds two start-flag sequences to the beginning of the data packet, and another start flag 01111110 as the end flag after the end of the data packet. The data packet with the two start flags and the end flag is then sent to switch core 14. Packet framer 18 uses a modified High-Level Data-Link Control (HDLC) encoding method to add the flags and zero-insertion. None of the other framing definitions of HDLC are used. Packet framer 18, encoder 66, and decoder 68 operate on serial data.

De-skew circuit 20 receives the transmitted packet, including the start and end flags, from switch core 14. De-skew circuit 20 measures the skew by comparing the phase of the start flag to the known start-flag sequence. The measured skew is saved and used to select the amount of delay needed to remove the measured skew from the packet. De-skew circuit 20 then removes this measured skew from the data packet as it is serially transmitted through de-skew circuit 20. Decoder 68 then removes any inserted zeros before the data packet, without the start and end flags, is sent to MAC 12.

Start Flag Added to Data Packet for Skew Measurement—FIG. 6

FIG. 6 is a diagram of a data packet 50 from MAC 12 and the packet transmitted through switch core 14. An original data packet is received at the source MAC from the transmitting network node. The MAC may calculate a frame checksum FCS from the data in the packet and append the <FCS> field to the data packet. The source network address <SA> and the destination network address <DA> are also part of data packet 50.

The MAC module adds two start flags 01111110 and an ending flag 01111110 to data packet 50 to generate transmitted packet 52. Data packet 50 is further modified by zero insertion to prevent the start flag pattern from occurring in data packet 50.

Packet Framer—FIG. 7

FIG. 7 is a diagram of a packet framer which adds a start flag sequence to each packet transmitted. Encoder 66 receives data packet 50 and inserts zeros after every sequence of five ones to prevent a sequence of six ones which occurs in the unique start flag 01111110. Mux 56 selects the serial bit stream of data packet 50 after zero-insertion after the start flag has been sent through mux 56. Mux 56 selects the start flag at the beginning of transmission before data packet 50 is transmitted, and after the last bit of data packet 50 is transmitted. A simple state machine or sequencer may be used to generate the start flag in serial format. Mux 56 outputs transmitted packet 52, which is converted to NRZI format by converter 58 before transmission through switch core 14. NRZI format is used for transmission rather than the standard RZ or NRZ formats of transmitted data packet 52 for two reasons. NRZI reduces the frequency of the serial data, reducing electro-magnetic interference. Also, the flag of 01111110 when converted to NRZI has several signal transitions of the physical signal which are easily detected and compared by the de-skew circuit.

Figure 8:
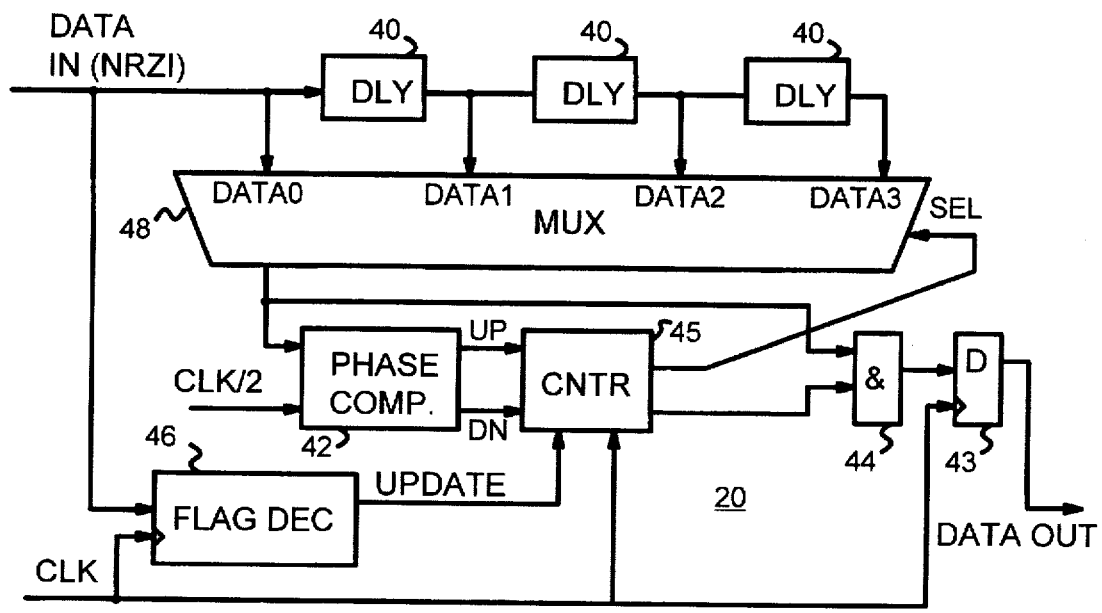
FIG. 8 is a diagram of a skew measurement and compensation circuit for a network switch.

De-Skew Circuit—FIG. 8

FIG. 8 is a diagram of a skew measurement and compensation circuit for a network switch. De-skew circuit 20 receives the serially-transmitted packet, before it is converted from NRZI to RZ format. The serial data is sent through various delay elements 40 producing different amounts of delay. For example, each delay element 40 may be selected to generate a delay of one-quarter of the clock period of clock CLK.

Mux 48 receives a select signal SEL from counter 45 indicating the amount of skew to add to the data input. This amount of skew is used to select an output from one of the four data inputs to mux 48 with the desired delay. The selected data input has some number of delay elements 40 which compensate for the measured skew. AND gate 44 prevents data from being output until skew measurement has occurred. Flip-flop 43 then synchronizes the selected output from mux 48 to the clock CLK and outputs a skew-compensated serial data stream to the destination MAC.

The mount of skew measured is determined by phase comparison of the selected data input of mux 48 to a locally-generated copy of the reference start flag pattern. Flag decoder 46 receives the serial data and generates and update signal when the start flag sequence of 01111110 is received, which requires that eight bits be received before the update signal is generated. Since two start flags are provided at the beginning of each packet, the first start flag is used by flag decoder 46 to detect the new packet, while the second start flag is used to determine the amount of skew. The start flag of 01111110 when converted to NRZI format contains three sequential pulses. Flag decoder 46 can simply start a counter when a positive edge of the input data is received. After 5 pulses of the local clock CLK, all three pulses should be received. Any deviation of the flag's pattern resets the flag-detect counter.

When flag detector 46 detects the first start flag, the UPDATE signal is activated, enabling counter 45. Phase comparator 42 compares the phase of the data input selected by mux 48 to the pre-determined flag pattern. Since the data is in NRZI format, the flag pattern is a series of three pulses, and a divided-down clock, CLK/2, may be used as the reference flag pattern. Phase comparator 42 activates the UP signal when the phase of the delayed data from mux 48 is behind the phase of the reference input, CLK/2. The UP signal increments counter 45 on the next rising edge of clock CLK. Incrementing counter 45 also increments the input selected from mux 48 by incrementing select signal SEL.

However, when the phase of the delayed data from mux 48 is ahead of the phase of the reference input, CLK/2, then phase comparator 42 activates the down signal DN. The down signal decrements counter 45 on the next rising edge of clock CLK. Decrementing counter 45 also decrements the input selected from mux 48 by decrementing select signal SEL so that a data input with less delay is chosen.

The phase comparison is repeated for the remaining pulses of the second start flag. At the end of the second flag pattern, flag decoder 46 de-asserts UPDATE, and counter 45 is locked into the last measured skew, continuing to select the desired data input of mux 48.

Accuracy can be improved by increasing the number of data inputs to mux 48, and adjusting the amount of delay in delay elements 40.

Figure 9:
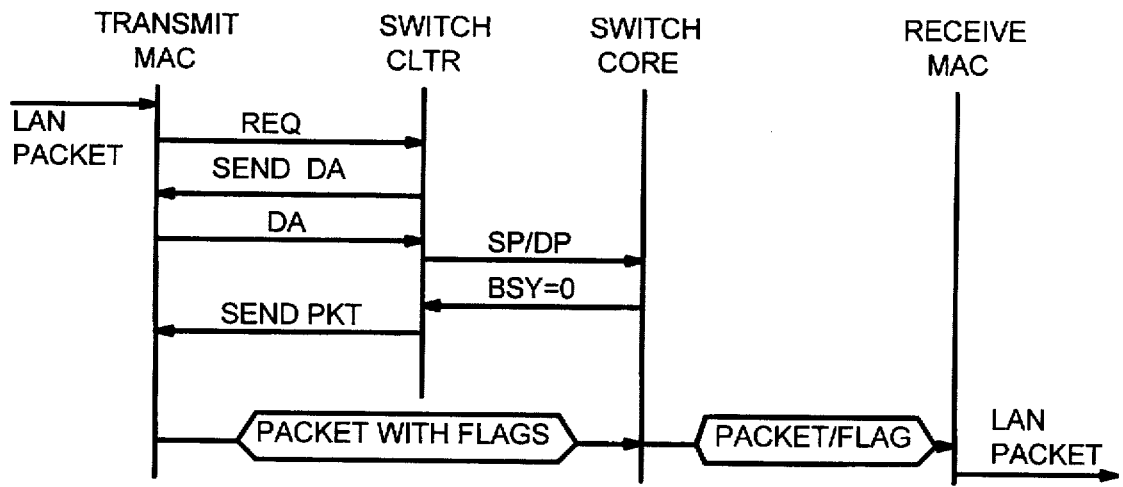
FIG. 9 is a transaction diagram showing control signals between the source MAC and the switch core and switch controller and the data packet transmitted.

Transaction Diagram—FIG. 9

FIG. 9 is a transaction diagram showing control signals between the source MAC and the switch core and switch controller and the data packet transmitted. A LAN packet is received by the source MAC from a network node which is transmitting the packet. The source MAC receives this packet into its buffer, and sends a request signal REQ to the switch controller. The switch controller arbitrates this request with other requests. When the switch controller is able to respond to the request from the source MAC, the SendDA signal is sent from the switch controller to the source MAC. The source MAC then sends the destination address to the switch controller. This destination address is a network address such as an OUI or MAC address which is many digits in length. The switch controller looks up this destination OUI address in a look-up table. If this OUI address matches one of the addresses of the other MAC's on the switch, then the 5-bit port address of the MAC's port on the switch core is read out of the look-up table. The 5-bit port address of the source MAC, SP, and the 5-bit port address of the destination MAC, DP, are sent to the switch core. Should the switch core determine that this link cannot currently be made, such as when one of the ports is connected in another link through the switch core, then the busy signal is sent back to the switch controller, which waits and tries again later.

Should the switch core be able to establish the link between the source port and the destination port, it send an inactive busy signal to the switch controller as an acknowledgment that the connection has been established. The switch controller next sends a Send packet signal to the source MAC, and the source MAC begins transmitting the zero-inserted data packet, with the start and end flags included. This packet is transmitted from the source MAC 19 the source port on the switch core, through the link established in the switch core to the destination port, and then to the destination MAC. The destination MAC detects the arrival of a packet by the start flag, measures the skew using the start flag, and adjusts the amount of skew removed. The destination MAC then strips off the start and end flags and removes the inserted zeros. The LAN packet is buffered and transmitted onto the network node connected to the destination MAC.

ADVANTAGES OF THE INVENTION

MAC module 70 may be designed for different protocols such as Ethernet, either 100 or 10 Mbps, Token ring, FDDI, or ATM. The protocol of the MAC does not affect the operation of the switch core since the switch core is a simple crossbar switch constructed from transistor switches. Some of the MAC modules may be for Token-ring network nodes while other MAC modules are for Ethernet nodes or ATM nodes. Thus a mixed-protocol network switch is feasible.

The MAC modules may also be located several meters from switch core 14, enabling a distributed architecture. The longer distance allows more MAC modules to be added or removed from a chassis. Since the skew is re-measured for each packet, moving a MAC module, which changes the skew, is accounted for at the beginning of each transmitted packet by re-measuring the skew and adjusting the skew compensation. MAC modules may be placed near the interface to the network node rather than next to the switch core itself. The skew compensation and re-measurement allows for flexible placement of the MAC modules while prior-art switches that are sensitive to skew normally must keep the MAC modules close to the switch core to minimize clock distribution.

Other adjustments to the network are also accommodated. A larger buffer on the MAC module may be installed to increase performance of a certain network node, such as a node to a server. Full-duplex mode may be used where two links are established through the switch core between two MAC's—one link in each direction. The reverse direction from destination MAC to source MAC may be used for flow control by sending messages to the source MAC to pause sending until the destination MAC can process the data. This flow control is known as back pressure.

The buffer can be configured in three ways, altering the switch properties. When a buffer is used at the input MAC to buffer the complete packet before transmission through the switch core, the switch becomes a store and forward switch. When the packet starts to be sent out through the switch core after a programmable number of bytes are received by the MAC, then the switch operates in modified cut through mode. When the packet starts to be transmitted after the destination address is received, then the switch operates in cut-through mode.

ALTERNATE EMBODIMENTS

Several other embodiments are contemplated by the inventors. For example the switch core has been described as being a matrix of analog n-channel MOS transistors, but complementary p-channel transistors may be used, either alone or in parallel with the n-channel transistors as full transmission gates. Other circuit enhancements are possible.

Address formats other than OUI addresses may be used. An Interconnect Protocol (IP) address may be used for routing Internet addresses. For asynchronous-transfer mode (ATM) networks, a virtual path identifier is used. The MAC's themselves may contain a look-up table with routing information. Such MAC's could transmit a shorter address to the switch controller. The partitioning of logic and functions among the switch core and the switch controller may also be modified by persons skilled in the art. While zero insertion has been described, other encoding schemes such as 4-bit to 5-bit encoding may be employed. The start flag may be any unique sequence and is not restricted to 01111110. The end flag may be identical to the start flag or a different flag may be used.

A larger module constructed of several MAC's may be used, further reducing costs by allowing the MAC's to share the buffer memory. The MAC module could be implemented as a single silicon chip as well as process technologies improve.

Multi-Clock Embodiment

The invention has been described as using a central clock source which is transmitted to the different MAC's. The skew is measured relative to this shared central clock. However, the inventors contemplate using locally-generated clocks. In this embodiment, each MAC has a clock oscillator which generates the local clock. The skew is measured relative to this local clock. As long as the local clock has the same frequency as the clock for the source MAC, the local clock may be out of phase to the remote clock and still be able to compensate by measuring the skew of the received data generated by the remote clock in comparison to the local clock. Since the skew is re-measured for each packet, the matching of the local and remote clocks is not as important as if the skew were measured less frequently. Thus measuring the skew for each packet enables a multi-clock system, and allows for much greater clock variance. The only relationship between the clocks is that the frequencies must match.

Figure 10:
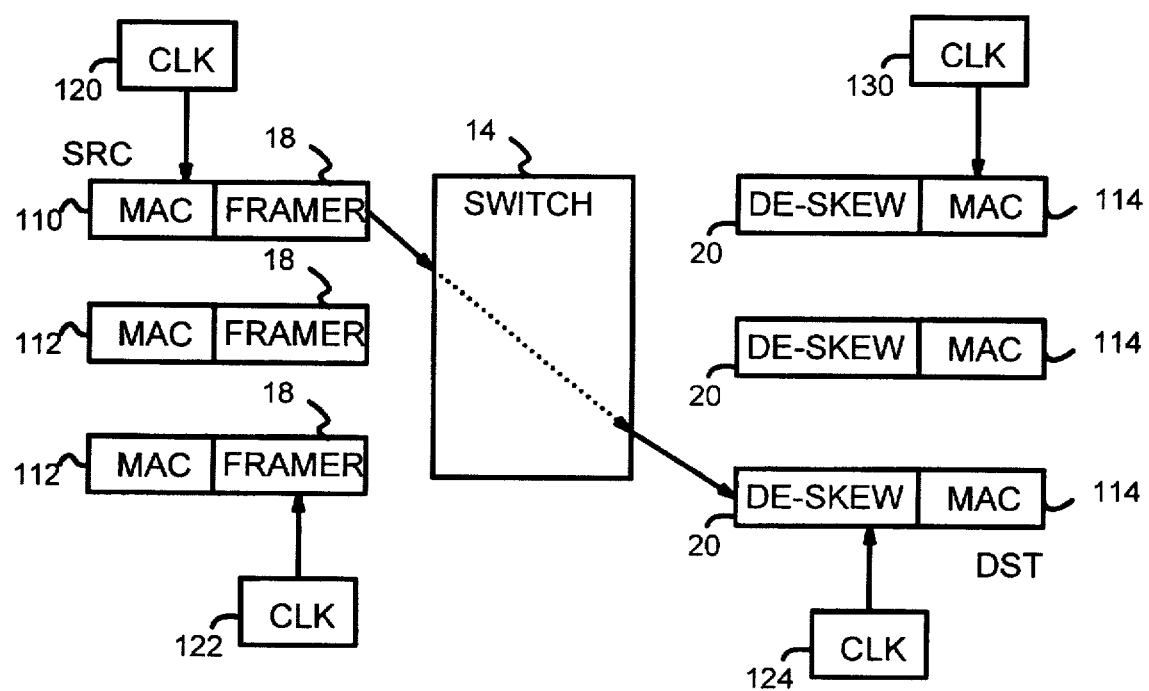
FIG. 10 is a diagram of a network switch with packet-based de-skewing which uses separate local clocks.

FIG. 10 is a diagram of a network switch with packet-based de-skewing which uses separate local clocks. Switch core 14 provides a single signal line for each half-duplex connection, or two data signal paths for each full-duplex connection. A source MAC 110, 112 pass the data packets through framer 18 to insert the start flag before being transmitted through switch core 14. A de-skew circuit 20 is provided for each destination MAC 114 to measure the skew of the start flag and adjust the delay of the data packet for the measured skew.

Rather than use a central clock, source MAC's 112 are provided with a locally-generated clock 120, while destination MAC's 114 are provided with a separately-generated clock 130. Each individual MAC could be provided with its own clock source, or groups of MAC's can share a clock source as shown. Clock source 122 is a clock dedicated to framers 18, while clock source 124 supplies the clock to de-skew circuits 20. All destination MAC's 114 use a shared clock 124, although destination MAC's 114 could use separate clocks. Likewise, each framer 18 could receive a separate clock, as could de-skew circuits 20.

Each individual MAC could have its own locally-generated clock, or groups of MAC modules may share a clock. Other alternative arrangements and partitions of the clock domains are possible.

The clock used by the framer and the clock used by the de-skew circuit operate at the same frequency, although the transmitting or receiving MAC module may operate at a different frequency. When the transmitting and receiving MAC's operate at different frequencies, then one frequency of the two MAC's is used for the framer and de-skewer. A divided-down clock may be used for the slower MAC.

For example, when both MAC's use the same protocol and speed, a single reference clock could be used. When different protocols are used, but with the same speed, the different MAC's for the different protocols may use different clocks, but the framer and de-skew circuit use the same frequency. The different protocols could be 100VG and Fast Ethernet.

When the same protocol is used, but different speeds, then the clocks for the two MAC's have different frequencies, but the framer and de-skew circuit use the same frequency. An example of this is 100BaseT and 10BaseT, which have the framer and de-skew circuit operating at the higher frequency of the 100BaseT MAC or the lower frequency of the 10 BaseT MAC.

Different protocols and different speeds are used when one MAC is an ATM 155 MAC while the other is a 100BaseT MAC. The framer and de-skew circuit operate at the same frequency.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A network switch comprising:
   a switch core having a plurality of input ports and a plurality of output ports, the switch core for establishing a plurality of temporary connections, each temporary connection between an input port and an output port;
   a plurality of media-access-controller (MAC) modules, including source MAC modules and destination MAC modules;
   each source MAC module in the plurality of MAC modules connected to an external network node for receiving data packets from the external network node, the source MAC module connected to an input port on the switch core;
   a packet framer in each source MAC module for adding a start flag to a beginning of a data packet before the data packet with the start flag is transmitted to the switch core;
   each destination MAC module in the plurality of MAC modules connected to an external network node for transmitting data packets to the external network node from the network switch, the destination MAC module connected to an output port on the switch core;
   packet de-skew means in each destination MAC module for measuring a skew in the start flag of each packet received from the switch core and compensating the data packet for the measured skew;
   whereby each data packet transmitted through the switch core is compensated for skew by measuring the skew of the start flag transmitted with the data packet.

2. The network switch of claim 1 wherein the start flag is a unique bit pattern not appearing in the data packet.

3. The network switch of claim 2 further comprising:
   encoding means, in the source MAC module, for modifying the data packet to prevent the unique bit pattern of the start flag from appearing in the data packet transmitted through the switch core;
   decoding means, in the destination MAC module, for reversing any modifications made by the encoding means to the data packet transmitted through the switch core to re-generate the data packet,
   whereby the data packet is modified before transmission through the switch core to modify any instance of the unique bit pattern of the start flag appearing in the data packet.

4. The network switch of claim 3 wherein the encoding means comprises zero-insertion means for inserting a zero bit after a sequence of ones in the data packet, the sequence of ones being a sequence of one less bit than in the unique bit pattern of the start flag, and wherein the decoding means comprises zero stripping means for removing an inserted zero after the sequence of ones in the data packet transmitted through the switch core.

5. The network switch of claim 1 wherein the packet de-skew means comprises a de-skew circuit in the destination MAC module including:
   detect means for detecting the start flag at the beginning of the data packet;
   variable delay means for adding a variable delay to the data packet;
   skew measure means for measuring the skew between bit-transitions in the data packet received by the de-skew circuit, the skew measured relative to a receive clock for clocking the destination MAC module;
   select means, coupled to the skew measure means and the variable delay means, for selecting as the variable delay an amount of delay to compensate for the skew measured by the skew measure means,
   whereby the de-skew circuit selects the variable delay added to the data packet to compensate for the measured skew.

6. The network switch of claim 5 further comprising:
   a central clock source for generating the receive clock to the destination MAC module and for generating a transmit clock to the source MAC module, wherein the skew is measured for the start flag transmitted by the source MAC module in synchronization to the transmit clock, the skew measured relative to the receive clock, whereby a central clock source is used for the source MAC module and the destination MAC module.

7. The network switch of claim 5 further comprising:

a receive clock source for generating the receive clock to the destination MAC module;

a transmit clock source for generating a transmit clock to the source MAC module;

wherein the skew is measured for the start flag transmitted by the source MAC module in synchronization to the transmit clock, the skew measured relative to the receive clock, wherein the transmit clock is independently generated from the receive clock from different clock sources, the transmit clock and the receive clock having substantially a same frequency but the transmit clock having an arbitrary phase relationship to the receive clock;

whereby a local clock source generates the source MAC module and a different local clock source generates the destination MAC module.

8. The network switch of claim 1 wherein the switch core comprises:

matrix of transistor switches, a transistor switch establishing a temporary connection when its gate is activated, the transistor switch having a source connected to an input port and a drain connected to an output port, whereby the switch core comprises transistor switches.

9. The network switch of claim 8 wherein the temporary connection through the switch core is absent any active buffering, whereby a simple transistor switch is used to conduct from the input port to the output port.

10. A switch for making multiple, simultaneous connections between nodes on a network, the switch comprising:

a switch-matrix core having a plurality of ports, the switch-matrix core establishing connections between the ports for analog transmission of data packets;

a plurality of framers, coupled to ports on the switch-matrix core, each framer for transmitting a flag header immediately before each data packet transmitted to a port of the switch-matrix;

a skew detector, coupled to a port of the switch-matrix core, for determining an amount of clock skew of a data packet transmitted through the switch-matrix core;

a skew compensator, coupled to the skew detector and coupled to the port of the switch-matrix core, for adding a delay to the data packet transmitted through the switch core, the delay being determined by the skew detector;

a plurality of media-access controllers (MAC's), each MAC connected to a node on the network for driving and receiving physical signals of a data packet;

each MAC including means for transmitting the data packet received from the node on the network to the framer and means for receiving a data packet from the skew compensator and re-transmitting the data packet to the node on the network, whereby skew is detected and compensated for.

11. The switch of claim 10 further comprising:

a switch controller, coupled to the switch-matrix core, for receiving a request and a destination address from a source MAC, the switch controller requesting a connection between a first port coupled to the source MAC and a second port connected to a destination MAC, the destination MAC being identified by the destination address;

arbitration means, within the switch controller, for selecting the request from the source MAC from a plurality of simultaneous requests from MAC's, whereby the switch controller arbitrates requests for the switch-matrix core.

12. The switch of claim 11 wherein the switch-matrix core comprises an integrated circuit (IC), the ports on the switch-matrix comprising pins on the IC, and wherein the switch controller comprises a separate IC, whereby the switch-matrix core is a separate IC than the switch controller.

13. The switch of claim 12 wherein the switch-matrix core further comprises:

a plurality of activity detectors for detecting an absence of signal transitions on a port;

tear-down means, responsive to the plurality of activity detectors, for disabling a connection between a first port and a second port when an absence of signal transitions is detected on the first port;

busy signal means, responsive to the switch controller requesting a connection between the first port and the second port, for signaling to the switch controller that the connection cannot be made when either the first port or the second port is not idle, whereby idle connections are closed by the switch-matrix core.

14. The switch of claim 11 wherein the connection between the first port coupled to the source MAC and the second port connected to a destination MAC comprises a single signal path through the switch-matrix core for uni-directional operation, or two signal paths through the switch-matrix core for full duplex communication between the source MAC and the destination MAC.

15. The switch of claim 11 wherein the plurality of MAC's include MAC's using a first protocol and MAC's using a second protocol, whereby the switch is a multi-protocol switch.

16. The switch of claim 15 further comprising a shared buffer for buffering the data packet, the shared buffer shared by a plurality of MAC's.

17. The switch of claim 15 wherein the first protocol is a 10BaseT protocol and the second protocol is a 100BaseT protocol, wherein the second protocol transmits data at a rate substantially ten times the rate of the first protocol.

18. The switch of claim 15 wherein the first protocol is an Ethernet protocol and the second protocol is an asynchronous-transfer mode (ATM) protocol.

19. A network switcher for connecting nodes on a network, the network switcher comprising:

a switch core comprising a plurality of transistors and a plurality of ports, a transistor in the plurality of transistors forming a connection path from a first port to a second port when a gate electrode of the transistor is activated, the connection path being formed by the transistor conducting current from the first port to the second port when the gate electrode is activated;

a path decoder, receiving a source port identifier for indicating a source port and a destination port identifier for indicating a destination port, for determining which single transistor in the plurality of transistors forms a connection path between the source port and the destination port, the path decoder activating the gate electrode for the single transistor to form the connection path;

a start-flag generator, for generating a unique sequence of serial bits as a start flag;

buffer means, coupled to a node on the network, for receiving a serial data stream from the node and storing the serial data stream;

request means, coupled to the buffer means, for sending the source port identifier and the destination port identifier to the path decoder when a serial data stream is received by the buffer means;

frame means, receiving the serial data stream from the buffer means, for transmitting the start flag followed by the serial data stream to the source port of the switch core in a serial format;

flag detect means, coupled to the destination port, for detecting the start flag transmitted through the switch core to the destination port;

skew measurement means, responsive to the flag detect means, for comparing a phase of a local clock to a phase of bit-transitions in the start flag and indicating a selected delay of the start flag causing the phase of the local clock to match the phase of the bit-transitions in the start flag;

delay means, receiving the serial data stream from the destination port, for adding the selected delay to each bit-transition in the serial data stream to generate a compensated data stream;

output means, for transmitting the compensated data stream to a destination node on the network, whereby skew of the start flag transmitted through the switch core is measured and used to compensate the serial data stream.

20. The network switcher of claim 19 wherein the serial data stream is a packet having a source address, a destination address, and a data field, whereby skew is measured for each packet transmitted through the switch core.

21. The network switcher of claim 20 wherein the frame means includes NRZI means for converting the serial data stream and the start flag into NRZI format to generate bit-transitions for each period of a clock.

* * * * *